(12) United States Patent
Tani

(10) Patent No.: US 11,568,851 B2
(45) Date of Patent: Jan. 31, 2023

(54) NOISE REDUCTION DEVICE, VEHICLE, AND NOISE REDUCTION METHOD

(71) Applicant: Panasonic Intellectual Property Management Co., Ltd., Osaka (JP)

(72) Inventor: Mitsuhiro Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/568,373

(22) Filed: Jan. 4, 2022

(65) Prior Publication Data

US 2022/0215826 A1 Jul. 7, 2022

(30) Foreign Application Priority Data

Jan. 7, 2021 (JP) .............................. JP2021-001336

(51) Int. Cl.
G10K 11/178 (2006.01)
B60Q 9/00 (2006.01)

(52) U.S. Cl.
CPC .. *G10K 11/17854* (2018.01); *G10K 11/17823* (2018.01); *G10K 11/17825* (2018.01); *G10K 11/17881* (2018.01); *B60Q 9/00* (2013.01); *G10K 2210/1282* (2013.01); *G10K 2210/3026* (2013.01); *G10K 2210/3027* (2013.01); *G10K 2210/3028* (2013.01)

(58) Field of Classification Search
CPC ....... G10K 11/17854; G10K 11/17823; G10K 11/17825; G10K 11/17881
See application file for complete search history.

(56) References Cited

U.S. PATENT DOCUMENTS

2015/0063581 A1 3/2015 Tani et al.
2021/0193103 A1* 6/2021 Zollner ............ G10K 11/17835

FOREIGN PATENT DOCUMENTS

WO 2014/006846 1/2014

* cited by examiner

*Primary Examiner* — Ping Lee
(74) *Attorney, Agent, or Firm* — Greenblum & Bernstein, P.L.C.

(57) ABSTRACT

An active noise reduction device includes: a reference signal inputter; an adaptive filter; a μ adjuster that calculates a step size parameter by multiplying a reference value for the step size parameter by a correction coefficient that is proportional to a reciprocal of a first representative input value that indicates a signal level of the reference signal in a first predetermined period; a filter coefficient updater that updates adaptive filter coefficient W by using the step size parameter calculated; and a determiner. When it is determined that a second representative input value is greater than a threshold value, at least one of the adaptive filter or the filter coefficient updater is transitioned from a normal state to a restriction state in which an effect of reducing noise is smaller than in the normal state.

10 Claims, 5 Drawing Sheets

NOISE REDUCTION DEVICE, VEHICLE, AND NOISE REDUCTION METHOD

CROSS REFERENCE TO RELATED APPLICATION

The present application is based on and claims priority of Japanese Patent Application No. 2021-1336 filed on Jan. 7, 2021.

FIELD

The present disclosure relates to an active noise reduction device that actively reduces noise by interfering a cancelling sound with the noise, a vehicle that includes the active noise reduction device, and an active noise reduction method.

BACKGROUND

Conventionally, an active noise reduction device is known that actively reduces noise by outputting a cancelling sound for cancelling out the noise from a cancelling sound source by using a reference signal that has a correlation with the noise and an error signal that is based on a residual sound generated through the interference between the noise and the cancelling sound in a predetermined space (see, for example, PTL 1). The active noise reduction device generates a cancelling signal for outputting the cancelling sound by using an adaptive filter so as to minimize the sum of squares of the error signal.

CITATION LIST

Patent Literature

PTL 1: WO 2014/006846

SUMMARY

The present disclosure provides an active noise reduction device capable of improving upon the above related art.

An active noise reduction device according to one aspect of the present disclosure includes: a reference signal inputter to which a reference signal that has a correlation with noise in a space in a vehicle is input, the reference signal being output by a reference signal source attached to the vehicle; an adaptive filter that generates a cancelling signal by applying an adaptive filter to the reference signal, the cancelling signal being used to output a cancelling sound for reducing the noise; a cancelling signal outputter to which the cancelling signal generated is output; a cancelling sound source that generates a cancelling sound to correspond to the cancelling signal; an error signal inputter to which an error signal is input, the error signal corresponding to a residual sound generated by interference between the cancelling sound and the noise; a simulated acoustic sound transfer characteristics filter that generates a filtered reference signal by correcting the reference signal by using simulated transfer characteristics obtained by simulating acoustic sound transfer characteristics from the cancelling signal outputter to the error signal inputter; a μ adjuster that calculates a step size parameter by multiplying a reference value for the step size parameter by a correction coefficient that is proportional to a reciprocal of a first representative input value that indicates a signal level of the reference signal or the filtered reference signal in a first predetermined period; a filter coefficient updater that updates a coefficient of the adaptive filter by using the error signal, the filtered reference signal generated, and the step size parameter calculated; and a determiner that determines whether a second representative input value is greater than a threshold value, the second representative input value indicating a signal level of the reference signal or the filtered reference signal in a second predetermined period that is shorter than the first predetermined period. At least one of the adaptive filter or the filter coefficient updater is transitioned from a normal state to a restriction state in which an effect of reducing the noise is smaller than in the normal state when it is determined that the second representative input value is greater than the threshold value.

An active noise reduction device according to one aspect of the present disclosure is capable of improving upon the above related art.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENT

Figure 1:
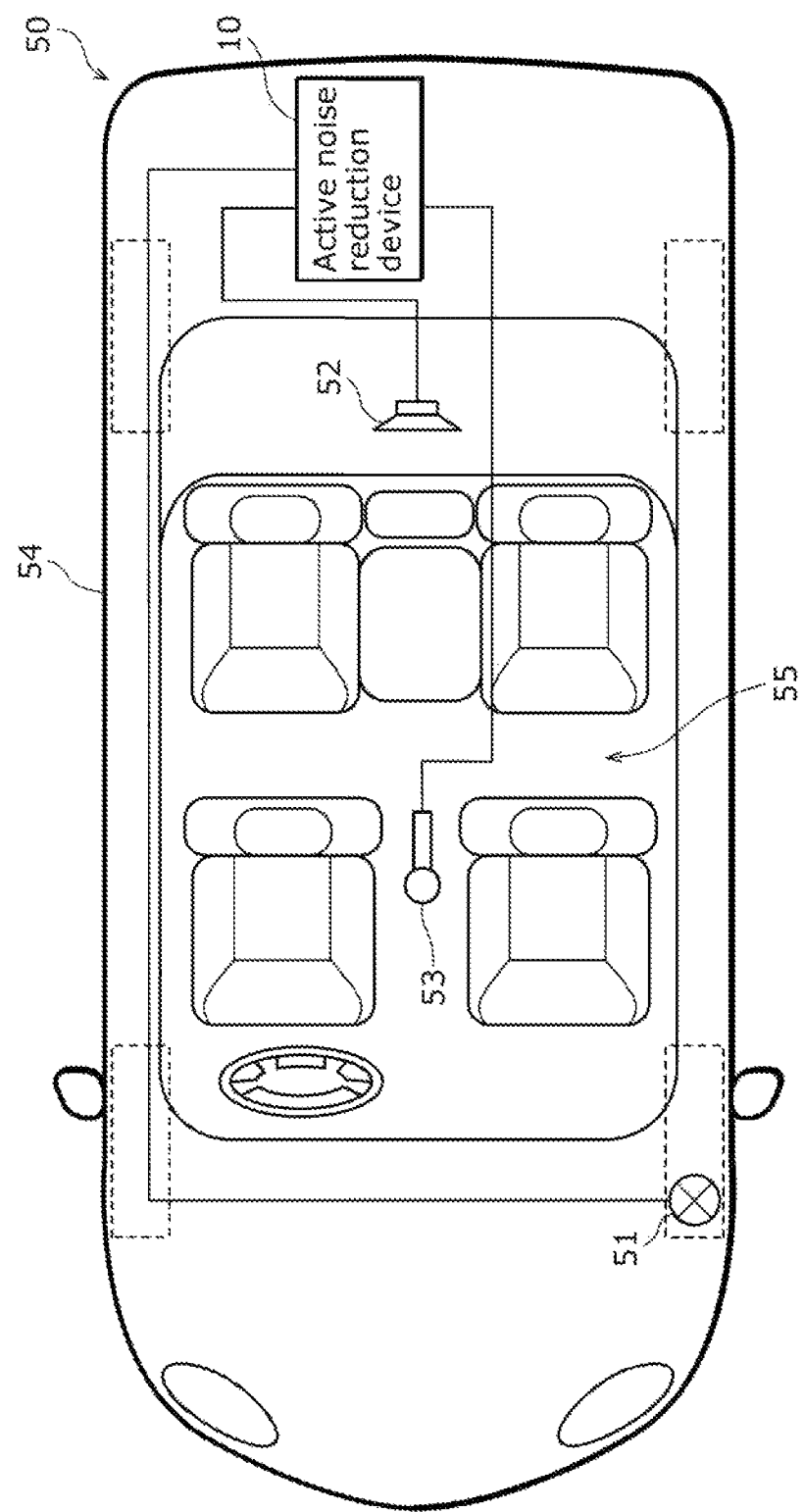
FIG. 1 is a schematic diagram of an automobile that includes an active noise reduction device according to an embodiment as viewed from above.

Hereinafter, an embodiment will be described specifically with reference to the drawings. The embodiment described below shows a generic or specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements.

Also, the diagrams are schematic representations, and thus are not necessarily true to scale. Also, in the diagrams, structural elements that are substantially the same are given the same reference numerals, and a redundant description may be omitted or simplified.

Embodiment

[Configuration of Automobile]

Hereinafter, an automobile according to an embodiment, and an active noise reduction device that is mounted on the automobile will be described. First, the automobile according to the embodiment will be described. FIG. 1 is a schematic diagram of the automobile according to the embodiment as viewed from above.

Automobile 50 is an example of a vehicle, and includes active noise reduction device 10 according to the present embodiment, reference signal source 51, cancelling sound source 52, error signal source 53, and automobile main body 54. Automobile 50 is specifically a passenger car, but the present disclosure is not limited thereto.

Reference signal source 51 is a transducer that outputs a reference signal that has a correlation with noise in space 55 of a cabin of automobile 50. In the present embodiment, reference signal source 51 is an acceleration sensor, and is disposed outside of space 55. Specifically, reference signal source 51 is attached to the subframe near the left front wheel (or, the wheelhouse of the left front wheel). However, there is no particular limitation on the attachment position of reference signal source 51. In the case where reference signal source 51 is an acceleration sensor, active noise reduction device 10 can reduce a roadway noise component that is included in the noise in space 55. The roadway noise has a complex propagation path, and it is therefore advantageous to provide acceleration sensors at a plurality of locations. Here, reference signal source 51 may be a microphone.

Cancelling sound source 52 outputs a cancelling sound to space 55 by using a cancelling signal. In the present embodiment, cancelling sound source 52 is a speaker, but the cancelling sound may be output as a result of one (for example, sunroof or the like) of the structural bodies of automobile 50 being vibrated by a driving mechanism such as an actuator. Also, in active noise reduction device 10, a plurality of cancelling sound sources 52 may be used, and there is no particular limitation on the attachment positions of cancelling sound sources 52.

Error signal source 53 detects a residual sound generated by interference between the noise and the cancelling sound in space 55, and outputs an error signal based on the residual sound. It is desirable that error signal source 53 is a transducer such as a microphone and is disposed in space 55 such as a headliner. Here, automobile 50 may include a plurality of error signal sources 53.

Automobile main body 54 is a structural body that includes a chassis, a body, and the like of automobile 50. Automobile main body 54 forms space 55 (the space in the automobile cabin) in which cancelling sound source 52 and error signal source 53 are disposed.

[Configuration of Active Noise Reduction Device]

Figure 2:
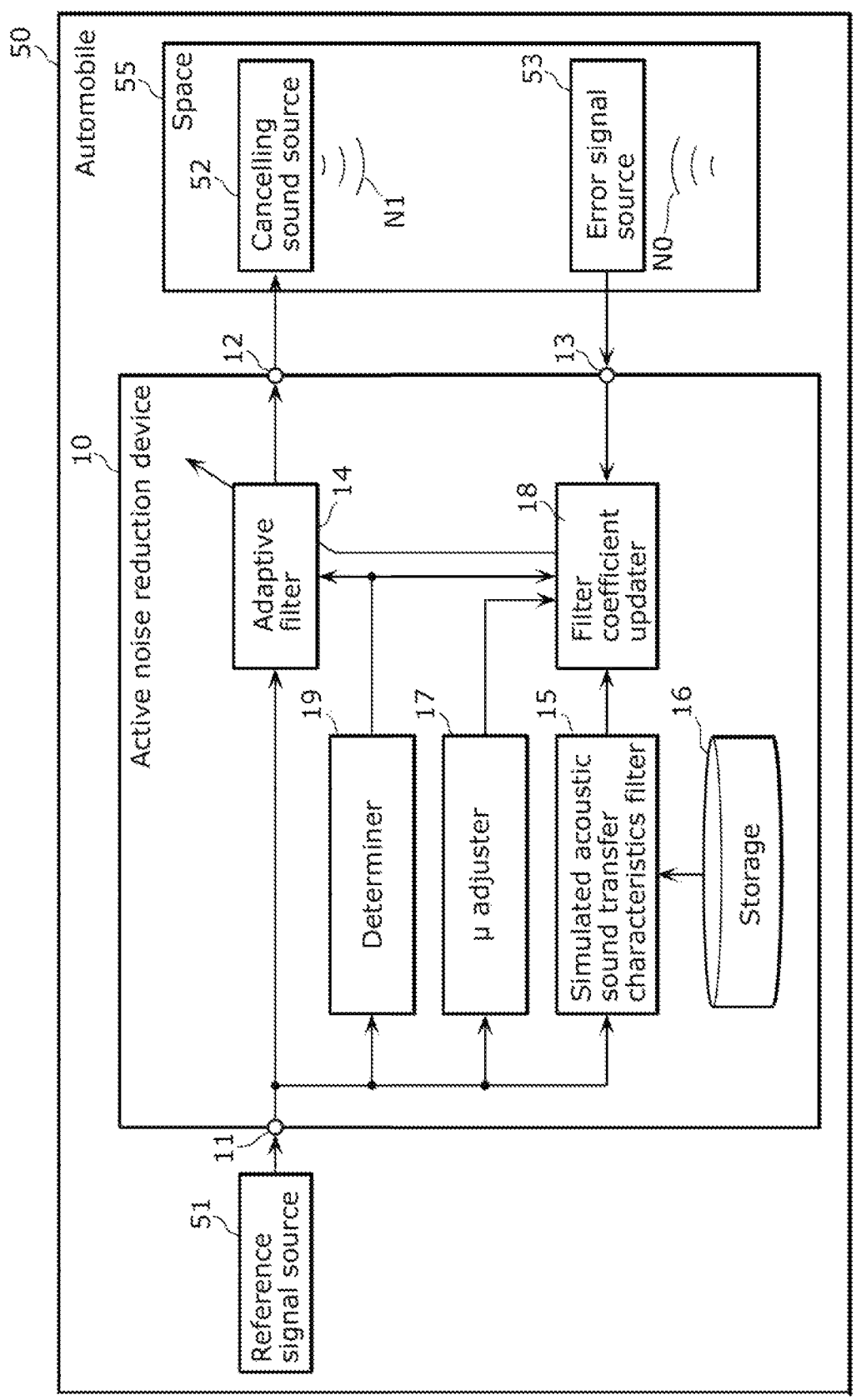
FIG. 2 is a block diagram showing a functional configuration of the active noise reduction device according to the embodiment.

Next, a configuration of active noise reduction device 10 will be described. FIG. 2 is a block diagram showing a functional configuration of active noise reduction device 10.

As shown in FIG. 2, active noise reduction device 10 includes reference signal input terminal 11, cancelling signal output terminal 12, error signal input terminal 13, adaptive filter 14, simulated acoustic sound transfer characteristics filter 15, storage 16, μ adjuster 17, filter coefficient updater 18, and determiner 19. Adaptive filter 14, simulated acoustic sound transfer characteristics filter 15, μ adjuster 17, filter coefficient updater 18, and determiner 19 are implemented by, for example, a processor such as a DSP (Digital Signal Processor) or a microcomputer executing software. Adaptive filter 14, simulated acoustic sound transfer characteristics filter 15, μ adjuster 17, filter coefficient updater 18, and determiner 19 may be implemented by using hardware such as circuits. Also, some of adaptive filter 14, simulated acoustic sound transfer characteristics filter 15, μ adjuster 17, filter coefficient updater 18, and determiner 19 may be implemented by using software, and the remaining ones may be implemented by using hardware.

[Normal Operation]

Figure 3:
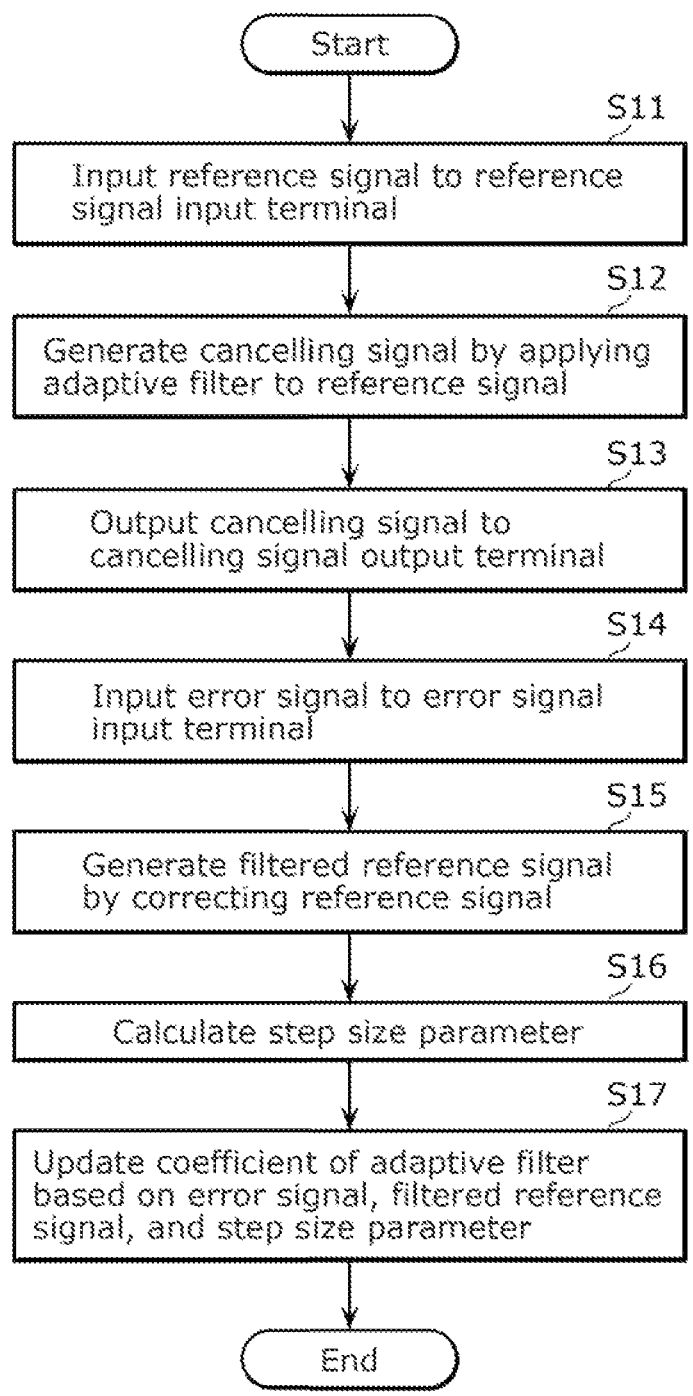
FIG. 3 is a flowchart of a normal operation performed by the noise reduction device according to the embodiment.

As described above, active noise reduction device 10 performs a noise reduction operation. First, a normal operation performed by active noise reduction device 10 will be described with reference to FIGS. 2 and 3. FIG. 3 is a flowchart of the normal operation performed by active noise reduction device 10.

First, a reference signal that has a correlation with noise N0 is input from reference signal source 51 to reference signal input terminal 11 (S11). Reference signal input terminal 11 is an example of a reference signal inputter, and is specifically a terminal made of a metal or the like.

The reference signal input to reference signal input terminal 11 is output to adaptive filter 14 and simulated acoustic sound transfer characteristics filter 15. Adaptive filter 14 generates a cancelling signal by applying (convolving) an adaptive filter to the reference signal input to reference signal input terminal 11 (S12). Adaptive filter 14 is implemented by using a so-called FIR filter or IIR filter. Adaptive filter 14 outputs the generated cancelling signal to cancelling signal output terminal 12. The cancelling signal is used to output cancelling sound N1 for reducing noise N0, and is output to cancelling signal output terminal 12 (S13).

Cancelling signal output terminal 12 is an example of a cancelling signal outputter, and is a terminal made of a metal or the like. The cancelling signal generated by adaptive filter 14 is output to cancelling signal output terminal 12.

Cancelling signal output terminal 12 is connected to cancelling sound source 52. Accordingly, the cancelling signal is output to cancelling sound source 52 via cancelling signal output terminal 12. Cancelling sound source 52 outputs cancelling sound N1 based on the cancelling signal.

Error signal source 53 detects a residual sound generated by interference between noise N0 and cancelling sound N1 output from cancelling sound source 52 to correspond to the cancelling signal, and outputs an error signal that corresponds to the residual sound. As a result, the error signal is input to error signal input terminal 13 (S14). Error signal input terminal 13 is an example of an error signal inputter, and is a terminal made of a metal or the like.

Next, simulated acoustic sound transfer characteristics filter 15 generates a filtered reference signal by correcting the reference signal by using simulated transfer characteristics obtained by simulating acoustic sound transfer characteristics from cancelling signal output terminal 12 to error signal input terminal 13 (S15). In other words, the simulated transfer characteristics are obtained by simulating acoustic sound transfer characteristics from the position of cancelling sound source 52 to the position of error signal source 53 (or in other words, the acoustic sound transfer characteristics in space 55). The simulated transfer characteristics are measured in, for example, space 55 and stored in storage 16 in advance. The simulated transfer characteristics may be determined by using an algorithm that does not use predetermined values.

Storage 16 is a storage device that stores the simulated transfer characteristics. Storage 16 also stores an adaptive filter coefficient, which will be described later, and the like. Storage 16 is specifically implemented by using a semiconductor memory or the like. In the case where adaptive filter 14, simulated acoustic sound transfer characteristics filter 15, μ adjuster 17, filter coefficient updater 18, and determiner 19 are implemented by using a processor such as a DSP, a control program that is executed by the processor is also stored in storage 16. Storage 16 may also store other parameters that are used in signal processing operations performed by adaptive filter 14, simulated acoustic sound transfer characteristics filter 15, μ adjuster 17, filter coefficient updater 18, and determiner 19.

μ adjuster 17 calculates step size parameter μ (S16). Step size parameter μ is a scalar quantity for determining the update amount of adaptive filter coefficient W per sample. Specifically, μ adjuster 17 calculates step size parameter μ based on Equation 1 and Equation 2 given below. Here, l is a natural number, and represents the l-th sample in sampling period Ts.

[Math. 1]

$$\mu(l) = \mu_{REF} \frac{d_{REF}}{d_1(l)} \quad \text{(Equation 1)}$$

$$d_1(l) = \sum_{n=0}^{N-1} \times (l-n)^2 \quad \text{(Equation 2)}$$

As shown in Equation 1 and Equation 2 given above, μ adjuster 17 calculates step size parameter μ by multiplying reference value $\mu_{REF}$ for step size parameter μ by correction coefficient $d_{REF}/d_1$ that is proportional to the reciprocal of first representative input value $d_1$. First representative input value $d_1$ represents the signal level of the reference signal, is a so-called squared norm, and is the root-mean-square of reference signal x in a most recent first predetermined period (a period that corresponds to the number of samples N (where N is a natural number)). Reference values $\mu_{REF}$ and $d_{REF}$ are fixed values determined in advance by performing a simulation, a driving test of automobile 50, or the like.

Filter coefficient updater 18 sequentially updates adaptive filter coefficient W based on the error signal, the generated filtered reference signal, and calculated step size parameter μ (S17). Specifically, filter coefficient updater 18 calculates adaptive filter coefficient W by using an LMS (Least Mean Square) method so as to minimize the sum of squares of the error signal, and outputs the calculated adaptive filter coefficient to adaptive filter 14. Also, filter coefficient updater 18 sequentially updates the adaptive filter coefficient. The adaptive filter coefficient W can be expressed by Equation 3 given below, where the error signal is represented by e, and the vector of the filtered reference signal is represented by R.

[Math. 2]

$$W(l+1) = W(l) - \mu(l) \times e(l) \times R(l) \quad \text{(Equation 3)}$$

Filter coefficient updater 18 may update adaptive filter coefficient W by using a method other than the LMS method.

Through the normal operation described above, active noise reduction device 10 can reduce the noise in space 55.

Step size parameter μ described above is generally a fixed value. If the value is too large, adaptive filter coefficient W is likely to diverge. If the value is too small, filter coefficient updater 18 cannot update adaptive filter coefficient W in time, and thus the effect of reducing noise N0 decreases.

In active noise reduction device 10, μ adjuster 17 calculates step size parameter μ based on Equation 1 and Equation 2 given above. By doing so, when the signal level of the reference signal is large (or in other words, when noise N0 is large), step size parameter μ is reduced, and thus the operation is stabilized. When the signal level of the reference signal is small (or in other words, when noise N0 is small), step size parameter μ is increased, and thus the effect of reducing noise N0 can be obtained quickly.

[Restriction Operation of Example 1]

The configuration for calculating step size parameter μ based on Equation 1 and Equation 2 given above has the following problems. If the first predetermined period (the number of samples N) when calculating first representative input value $d_1$ is set to be short, step size parameter μ is excessively adjusted, and the reference signal appears as if it does not vary in the computation that uses the LMS method. Thus, adaptive filter coefficient W is not updated appropriately.

Figure 4:
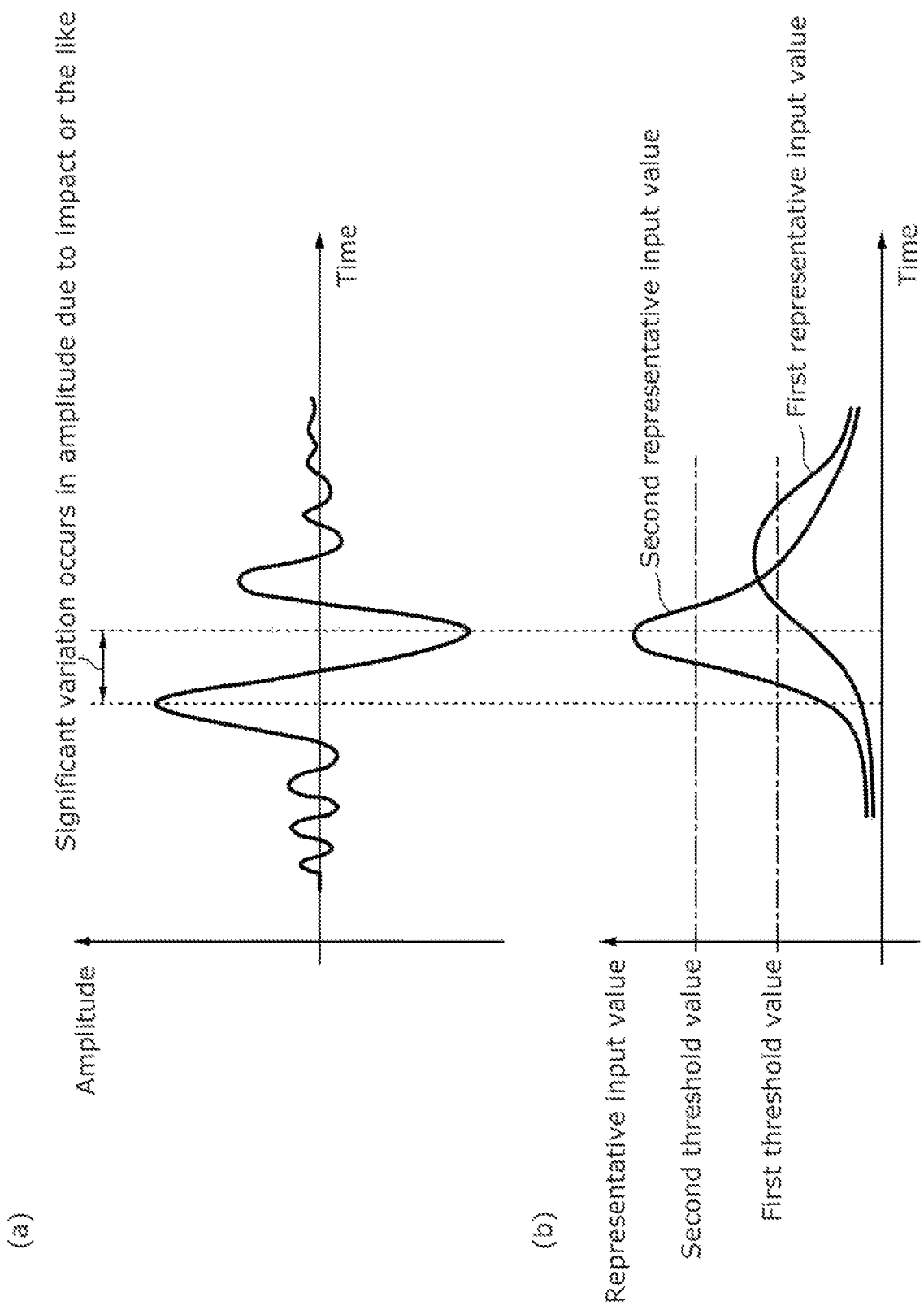
FIG. 4 is a diagram showing an example of time variation of the amplitude of a reference signal, a first representative input value, and a second representative input value.

On the other hand, if the first predetermined period is set to be long, the following of step size parameter μ according to the variation of noise N0 may not be performed in time. For example, in the case where automobile 50 runs over a bump in a state in which the signal level of the reference signal is low, an impact is applied to automobile 50, and the reference signal varies significantly. FIG. 4 is a diagram showing an example of time variation of the amplitude of the reference signal and first representative input value $d_1$. (a) in FIG. 4 shows a time variation of the amplitude of the reference signal, and (b) in FIG. 4 shows a time variation of first representative input value $d_1$. (b) in FIG. 4 also shows second representative input value $d_2$, a first threshold value, a second threshold value, and the like, which will be described later.

As shown in FIG. 4, first representative input value $d_1$ increases with a delay from the timing at which the signal level of the reference signal started to vary, and thus the value remains small immediately after the impact was applied to automobile 50. In other words, the value of step size parameter μ remains large immediately after the impact was applied to automobile 50. Accordingly, control of noise N0 becomes unstable immediately after the impact was applied to automobile 50, and cancelling sound N1 may be transformed into an abnormal sound.

To address this, in active noise reduction device 10, determiner 19 determines whether the state of noise N0 in space 55 has undergone a sudden change by using second representative input value $d_2$ that has a higher followability to the reference signal as compared with that of first representative input value $d_1$. Second representative input value $d_2$ is the root-mean-square of the reference signal in a most recent second predetermined period, and is expressed by, for example, Equation 4 given below.

[Math. 3]

$$d_2(l) = \sum_{m=0}^{M-1} \times (l-m)^2 \quad \text{(Equation 4)}$$

The second predetermined period is a period that is shorter than the first predetermined period and corresponds to the number of samples M (where M is a natural number smaller than N). M is set to, for example, about one tenth of N.

In active noise reduction device 10, if it is determined by determiner 19 that the state of noise N0 has undergone a sudden change, at least one of adaptive filter 14 or filter coefficient updater 18 performs a restriction operation for being transitioned from a normal state to a restriction state in which the effect of reducing noise N0 is smaller than in the normal state. Hereinafter, a restriction operation of example 1 will be described with reference to FIG. 5. FIG.

5 is a flowchart of the restriction operation of example 1 performed by active noise reduction device 10.

While active noise reduction device 10 is performing a normal operation, and filter coefficient updater 18 is updating adaptive filter coefficient W in a normal state (S21), determiner 19 acquires a reference signal, calculates second representative input value $d_2$ (S22), and determines whether calculated second representative input value $d_2$ is greater than a second threshold value (S23).

If it is determined that second representative input value $d_2$ is less than or equal to the second threshold value, it indicates that the signal level of the reference signal does not vary significantly, and it is therefore considered that there is no sudden variation in the state of noise N0 in space 55. Accordingly, if it is determined that second representative input value $d_2$ is less than or equal to the second threshold value, (No in S23), the normal state is continued (S21).

On the other hand, if it is determined that second representative input value $d_2$ is greater than the second threshold value, it indicates a possibility that the signal level of the reference signal varies significantly, and the state of noise N0 in space 55 undergoes a sudden change. Accordingly, if it is determined that second representative input value $d_2$ is greater than the second threshold value (Yes in S23), at least one of adaptive filter 14 or filter coefficient updater 18 is transitioned from the normal state to a restriction state (S24).

The restriction state is a state in which the effect of reducing noise N0 is smaller than in the normal state (or a state in which it is estimated that the effect is reduced). First, an example of an operation performed by filter coefficient updater 18 in the restriction state will be described. For example, filter coefficient updater 18 in the restriction state stops the update of adaptive filter coefficient W. Specifically, filter coefficient updater 18 in the restriction state sets step size parameter µ in Equation 3 given above to 0, and continuously outputs the same adaptive filter coefficient W to adaptive filter 14. Filter coefficient updater 18 may also stop the update of adaptive filter coefficient W by setting W(n+1)=W(n) and not rewriting W.

Also, filter coefficient updater 18 in the restriction state may update adaptive filter coefficient W by using a step size parameter obtained by multiplying step size parameter µ calculated by µ adjuster 17 by a coefficient that is greater than 0 and smaller than 1. That is, filter coefficient updater 18 in the restriction state may update adaptive filter coefficient W by using a step size parameter smaller than that used in the normal state.

Next, an operation performed by adaptive filter 14 in the restriction state will be described. Adaptive filter 14 in the restriction state generates a cancelling signal by applying an adaptive filter to the reference signal multiplied by a coefficient that is greater than 0 and smaller than 1.

Also, adaptive filter 14 in the restriction state may generate the cancelling signal by applying an adaptive filter obtained by multiplying the reference signal by a coefficient that is greater than 0 and smaller than 1, or adaptive filter 14 in the restriction state may multiply the generated cancelling signal by a coefficient that is greater than 0 and smaller than 1, and output a multiplication result.

In either case, adaptive filter 14 in the restriction state performs processing such that the signal level of the cancelling signal is smaller than that in the normal state.

In step S24, out of adaptive filter 14 and filter coefficient updater 18, only adaptive filter 14 may be transitioned to the restriction state. Alternatively, out of adaptive filter 14 and filter coefficient updater 18, only filter coefficient updater 18 may be transitioned to the restriction state. Also, in step S24, both of adaptive filter 14 and filter coefficient updater 18 may be transitioned to the restriction state.

The restriction state may be divided into a plurality of stages, and the coefficient that is greater than 0 and smaller than 1 and is to be multiplied by step size parameter µ may be changed for each stage. Also, in the case where the restriction state is divided into a plurality of stages, it is possible to perform control such that step size parameter µ is multiplied by the coefficient that is greater than 0 and smaller than 1 in the first stage, and the cancelling signal is multiplied by the coefficient that is greater than 0 and smaller than 1 at the second stage.

As described above, when the state of noise N0 undergoes a sudden change, active noise reduction device 10 transitions at least one of adaptive filter 14 or filter coefficient updater 18 into the restriction state, and it is thereby possible to stabilize the control of noise N0.

Transitioning back to the normal state from the restriction state is performed when, for example, the ignition power supply of automobile 50 is turned off and again turned on. However, the transitioning back to the normal state may be performed when a predetermined period passes after a transition to the restriction state is made, or the transitioning back to the normal state may be performed when the requirement in step S23 described above is no longer satisfied.

[Restriction Operation of Example 2]

Figure 5:
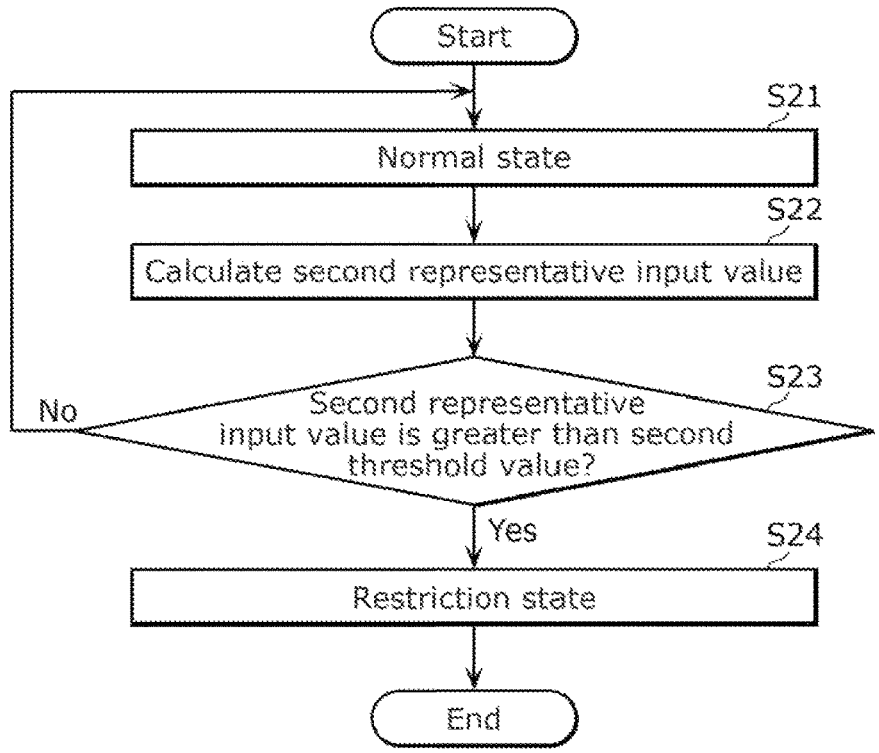
FIG. 5 is a flowchart of a restriction operation of example 1 performed by the active noise reduction device according to the embodiment.

In the example shown in FIG. 5, at least one of adaptive filter 14 or filter coefficient updater 18 is transitioned to the restriction state based on whether the requirement that the second representative input value $d_2$ is greater than the second threshold value is satisfied. Here, control of noise N0 is likely to be unstable when the signal level of the reference signal undergoes a sudden change while step size parameter µ is large, or in other words, first representative input value $d_1$ is small and second representative input value $d_2$ is large.

Figure 6:
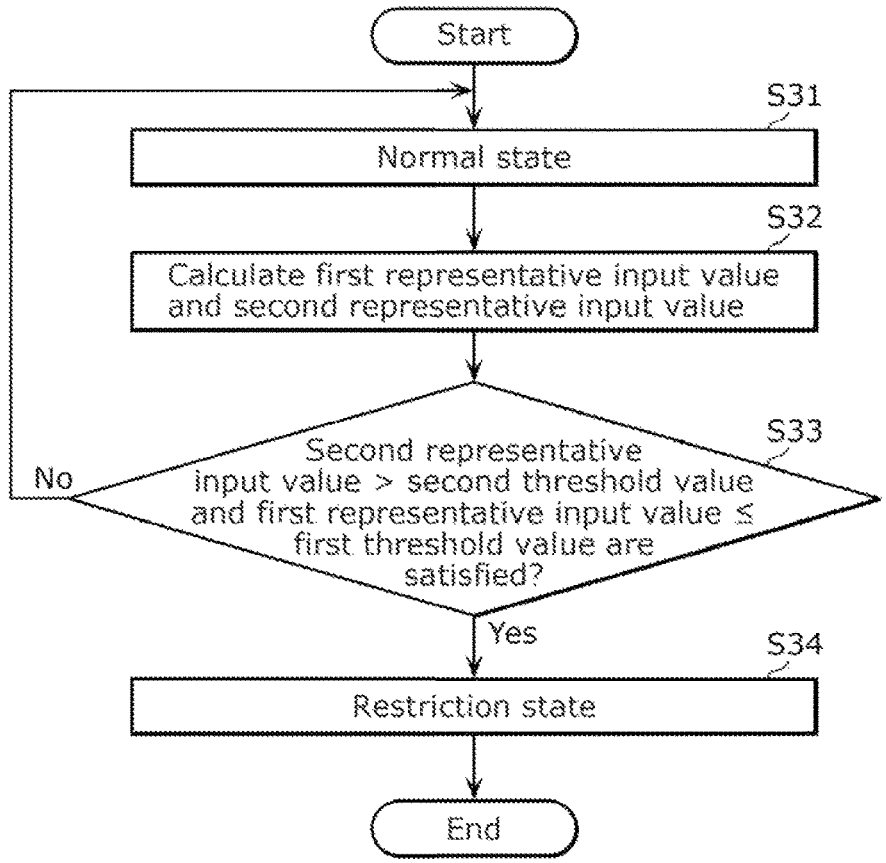
FIG. 6 is a flowchart of a restriction operation of example 2 performed by the active noise reduction device according to the embodiment

To address this, determiner 19 may further determine whether first representative input value $d_1$ is small. Hereinafter, a restriction operation of example 2 will be described with reference to FIG. 6. FIG. 6 is a flowchart of the restriction operation of example 2 performed by active noise reduction device 10.

While active noise reduction device 10 is performing a normal operation, and filter coefficient updater 18 is updating adaptive filter coefficient W in a normal state (S31), determiner 19 acquires a reference signal, calculates first representative input value $d_1$ and second representative input value $d_2$ (S32), and determines whether calculated second representative input value $d_2$ is greater than a second threshold value and calculated first representative input value $d_1$ is less than or equal to a first threshold value (S33). The first threshold value and the second threshold value may be, for example, different values or the same value.

If it is determined that the requirement that second representative input value $d_2$ is greater than the second threshold value and first representative input value $d_1$ is less than or equal to the first threshold value is not satisfied (No in S33), the normal state is continued (S31). On the other hand, if it is determined that second representative input value $d_2$ is greater than the second threshold value and first representative input value $d_1$ is less than or equal to the first threshold value (Yes in S33), at least one of adaptive filter 14 or filter coefficient updater 18 is transitioned from the normal state to the restriction state (S34). The operation performed by adaptive filter 14 in the restriction state and the operation performed by filter coefficient updater 18 in the restriction state have been described above.

As described above, determiner 19 may determine, in addition to whether second representative input value $d_2$ is greater than the second threshold value, whether first representative input value $d_1$ is less than or equal to the first threshold value, and at least one of adaptive filter 14 or filter coefficient updater 18 may be transitioned from the normal state to the restriction state based on whether the requirement that second representative input value $d_2$ is greater than the second threshold value and first representative input value $d_1$ is less than or equal to the first threshold value is satisfied.

By doing so, at least one of adaptive filter 14 or filter coefficient updater 18 is transitioned from the normal state to the restriction state only when the need for restricting the operation is high. Accordingly, active noise reduction device 10 can effectively reduce noise N0.

In step S33, a determination was made as to whether first representative input value $d_1$ is less than or equal to the first threshold value. However, instead of this determination, a determination may be made as to whether the ratio $(d_1/d_2)$ of first representative input value $d_1$ to second representative input value $d_1$ is less than or equal to a predetermined value. That is, in step S33, determiner 19 may determine whether second representative input value $d_2$ is greater than the second threshold value and the ratio $(d_1/d_2)$ of first representative input value $d_1$ to second representative input value $d_1$ is less than or equal to a predetermined value.

[Variation]

In the embodiment given above, first representative input value $d_1$ and second representative input value $d_2$ were described as the squared norm of the signal level of the reference signal, but first representative input value $d_1$ and second representative input value $d_2$ may be the norms RMS (Root Mean Square), or absolute values, or the like of the signal level of the reference signal. First representative input value $d_1$ and second representative input value $d_2$ each may be a parameter that indicates the signal level of the reference signal.

Also, first representative input value $d_1$ and second representative input value $d_2$ each may be a parameter that indicates the signal level of the filtered reference signal. Specifically, first representative input value $d_1$ and second representative input value $d_2$ may be the squared norms of the signal level of the filtered reference signal, or may be the norms of the signal level of the filtered reference signal.

[Advantageous Effects, Etc.]

As described above, active noise reduction device 10 includes: reference signal input terminal 11 to which a reference signal that has a correlation with noise N0 in space 55 of automobile 50 is input, the reference signal being output by reference signal source 51 that is attached to automobile 50; adaptive filter 14 that generates a cancelling signal by applying an adaptive filter to the reference signal, the cancelling signal being used to output cancelling sound N1 for reducing noise N0; cancelling signal output terminal 12 to which the generated cancelling signal is output; cancelling sound source 52 that generates a cancelling sound to correspond to the cancelling signal; error signal input terminal 13 to which an error signal is input, the error signal corresponding to a residual sound generated by interference between the cancelling sound and noise N0; simulated acoustic sound transfer characteristics filter 15 that generates a filtered reference signal by correcting the reference signal by using simulated sound transfer characteristics obtained by simulating acoustic sound transfer characteristics from cancelling signal output terminal 12 to error signal input terminal 13; $\mu$ adjuster 17 that calculates step size parameter $\mu$ by multiplying reference value $\mu_{REF}$ for step size parameter $\mu$ by a correction coefficient that is proportional to a reciprocal of first representative input value $d_1$ that indicates a signal level of the reference signal or the filtered reference signal in a first predetermined period; filter coefficient updater 18 that updates adaptive filter coefficient W by using the error signal, the generated filtered reference signal, and calculated step size parameter p; and determiner 19 that determines whether second representative input value $d_2$ is greater than a threshold value, second representative input value $d_2$ indicating a signal level of the reference signal or the filtered reference signal in a second predetermined period that is shorter than the first predetermined period. At least one of adaptive filter 14 or filter coefficient updater 18 is transitioned from a normal state to a restriction state in which the effect of reducing noise N0 is smaller than in the normal state when it is determined that second representative input value $d_2$ is greater than the threshold value.

In active noise reduction device 10 configured as described above, when the state of noise N0 in space 55 of automobile 50 undergoes a sudden change, the control of noise N0 can be stabilized.

Also, for example, determiner 19 determines whether first representative input value $d_1$ is less than or equal to a first threshold value in addition to determining whether second representative input value $d_2$ is greater than a second threshold value that is the above-described threshold value. At least one of adaptive filter 14 or filter coefficient updater 18 is transitioned from the normal state to the restriction state when it is determined that second representative input value $d_2$ is greater than the second threshold value and first representative input value $d_1$ is less than or equal to the first threshold value.

In active noise reduction device 10 configured as described above, at least one of adaptive filter 14 or filter coefficient updater 18 is transitioned to the restriction state only when the need for restricting the operation is high, and it is therefore possible to effectively reduce noise N0.

Also, for example, determiner 19 determines whether the ratio of first representative input value $d_1$ to second representative input value $d_2$ is less than or equal to a predetermined value in addition to determining whether the second representative input value is greater than a second threshold value that is the above-described threshold value, and when it is determined that second representative input value $d_2$ is greater than the second threshold value and the ratio of first representative input value $d_1$ to second representative input value $d_2$ is less than or equal to the predetermined value, at least one of adaptive filter 14 or filter coefficient updater 18 is transitioned from the normal state to the restriction state.

In active noise reduction device 10 configured as described above, at least one of adaptive filter 14 or filter coefficient updater 18 is transitioned to the restriction state only when the need for restricting the operation is high, and it is therefore possible to effectively reduce noise N0.

Also, for example, filter coefficient updater 18 in the restriction state stops the update of the coefficient of the adaptive filter.

In active noise reduction device 10 configured as described above, the control of noise N0 can be stabilized by stopping the update of the coefficient of the adaptive filter when the state of noise NO in space 55 of automobile 50 undergoes a sudden change.

Also, for example, filter coefficient updater 18 in the restriction state updates adaptive filter coefficient W by using a step size parameter obtained by multiplying calculated step size parameter µ by a coefficient that is greater than 0 and smaller than 1.

In active noise reduction device 10 configured as described above, the control of noise N0 can be stabilized by updating the coefficient of the adaptive filter by using a relatively small step size parameter when the state of noise N0 in space 55 of automobile 50 undergoes a sudden change.

Also, for example, adaptive filter 14 in the restriction state generates the cancelling signal by applying the adaptive filter to the reference signal multiplied by a coefficient that is greater than 0 and smaller than 1.

In active noise reduction device 10 configured as described above, the control of noise N0 can be stabilized by setting the signal level of the reference signal to be relatively small when the state of noise N0 in space 55 of automobile 50 undergoes a sudden change.

Also, for example, adaptive filter 14 in the restriction state generates the cancelling signal by applying the adaptive filter obtained by multiplying the reference signal by a coefficient that is greater than 0 and smaller than 1.

In active noise reduction device 10 configured as described above, the control of noise N0 can be stabilized by setting adaptive filter coefficient W to be relatively small when the state of noise N0 in space 55 of automobile 50 undergoes a sudden change.

Also, for example, adaptive filter 14 in the restriction state multiplies the generated cancelling signal by a coefficient that is greater than 0 and smaller than 1 and outputs a multiplication result.

In active noise reduction device 10 configured as described above, the control of noise N0 can be stabilized by setting the signal level of the cancelling signal to be relatively small when the state of noise N0 in space 55 of automobile 50 undergoes a sudden change.

Also, automobile 50 includes active noise reduction device 10 and reference signal source 51.

With automobile 50 configured as described above, the control of noise N0 can be stabilized when the state of noise N0 in space 55 of automobile 50 undergoes a sudden change.

Also, an active noise reduction method that is executed by a computer such as active noise reduction device 10 includes: determining whether a second representative input value is greater than a threshold value, the second representative input value indicating a signal level of the reference signal or the filtered reference signal in a second predetermined period that is shorter than the first predetermined period; and transitioning at least one of adaptive filter 14 or filter coefficient updater 18 from a normal state to a restriction state in which the effect of reducing noise N0 is smaller than in the normal state when it is determined that the second representative input value is greater than the threshold value.

With the active noise reduction method described above, the control of noise N0 can be stabilized when the state of noise N0 in space 55 of automobile 50 undergoes a sudden change.

Other Embodiments

The embodiment has been described above, but the present disclosure is not limited to the embodiment.

For example, the active noise reduction device according to the embodiment given above may be incorporated in a vehicle other than an automobile. The vehicle may be, for example, an aircraft or a vessel. Also, the present disclosure may be implemented as a vehicle other than an automobile as described above.

Also, the configuration of the active noise reduction device according to the embodiment given above is an example. For example, the active noise reduction device may include structural elements such as a D/A converter, a filter, a power amplifier, and an A/D converter.

Also, in the embodiment given above, the reference signal inputter, the error signal inputter, and the cancelling signal outputter were described as different terminals, but may be configured as a single terminal. For example, by using a digital communication standard with which devices such as the reference signal source, the error signal source, and the cancelling sound source can be connected in a chain, the reference signal inputter, the error signal inputter, and the cancelling signal outputter can be implemented by a single terminal.

Also, the processing performed by the active noise reduction device according to the embodiment given above is an example. For example, a portion of the digital signal processing described in the embodiment given above may be implemented by using analog signal processing.

Also, for example, in the embodiment given above, the processing performed by a specific processor may be performed by another processor. Also, the order in which a plurality of processing operations are performed may be changed, and a plurality of processing operations may be performed in parallel.

Also, in the embodiment given above, the structural elements may be implemented by executing a software program suitable for the structural elements. The structural elements may be implemented by a program executor such as a CPU or a processor reading a software program recorded in a recording medium such a hard disk or a semiconductor memory and executing the software program.

Also, in the embodiment given above, the structural elements may be implemented by using hardware. For example, the structural elements may be circuits (or integrated circuits). These circuits may constitute one circuit as a whole, or may be separate circuits. Also, each of these circuits may be a general-purpose circuit or a dedicated circuit.

Also, general and specific aspects of the present disclosure may be implemented by using a system, a device, a method, an integrated circuit, a computer program, or a computer-readable recording medium such as a CD-ROM. Alternatively, general and specific aspects of the present disclosure may be implemented by using any combination of systems, devices, methods, integrated circuits, computer programs, and computer-readable recording media.

For example, the present disclosure may be implemented as an active noise reduction method that is executed by an active noise reduction device (a computer or a DSP), or may be implemented as a program for causing a computer or a DSP to execute the active noise reduction method. Also, the present disclosure may be implemented as a computer-readable non-transitory recording medium in which the program is recorded. Also, the present disclosure may be implemented as a vehicle (for example, an automobile) or an active noise reduction system. The vehicle or the active noise reduction system described above includes, for example, the active noise reduction device and the reference signal source according to the embodiment given above.

The present disclosure also encompasses other embodiments obtained by making various modifications that can be conceived by a person having ordinary skill in the art to the above embodiment as well as embodiments implemented by any combination of the structural elements and the functions of the above embodiment without departing from the scope of the present invention.

While various embodiments have been described herein above, it is to be appreciated that various changes in form and detail may be made without departing from the spirit and scope of the present disclosure as presently or hereafter claimed.

Further Information About Technical Background to This Application

The disclosure of the following patent application including specification, drawings and claims are incorporated herein by reference in its entirety: Japanese Patent Application No. 2021-1336 filed on Jan. 7, 2021.

INDUSTRIAL APPLICABILITY

The active noise reduction device according to the present disclosure is useful as a device that can reduce noise in, for example, an automobile cabin.

The invention claimed is:

1. An active noise reduction device comprising:
a reference signal inputter to which a reference signal that has a correlation with noise in a space in a vehicle is input, the reference signal being output by a reference signal source attached to the vehicle;
an adaptive filter that generates a cancelling signal by adaptively filtering the reference signal, the cancelling signal being used to output a cancelling sound for reducing the noise;
a cancelling signal outputter to which the cancelling signal generated is output;
a cancelling sound source that generates a cancelling sound to correspond to the cancelling signal;
an error signal inputter to which an error signal is input, the error signal corresponding to a residual sound generated by interference between the cancelling sound and the noise;
a simulated acoustic sound transfer characteristics filter that generates a filtered reference signal by correcting the reference signal by using simulated transfer characteristics obtained by simulating acoustic sound transfer characteristics from the cancelling signal outputter to the error signal inputter;
a $\mu$ adjuster that calculates a step size parameter by multiplying a reference value for the step size parameter by a correction coefficient that is proportional to a reciprocal of a first representative input value that indicates a signal level of the reference signal or the filtered reference signal in a first predetermined period;
a filter coefficient updater that updates a coefficient of the adaptive filter by using the error signal, the filtered reference signal generated, and the step size parameter calculated; and
a determiner that determines whether a second representative input value is greater than a threshold value, the second representative input value indicating a signal level of the reference signal or the filtered reference signal in a second predetermined period that is shorter than the first predetermined period,
wherein at least one of the adaptive filter or the filter coefficient updater is transitioned from a normal state to a restriction state in which an effect of reducing the noise is smaller than in the normal state when it is determined that the second representative input value is greater than the threshold value.

2. The active noise reduction device according to claim 1, wherein the determiner determines whether the first representative input value is less than or equal to a first threshold value in addition to determining whether the second representative input value is greater than a second threshold value that is the threshold value,
when it is determined that the second representative input value is greater than the second threshold value and the first representative input value is less than or equal to the first threshold value, at least one of the adaptive filter or the filter coefficient updater is transitioned from the normal state to the restriction state.

3. The active noise reduction device according to claim 1, wherein the determiner determines whether a ratio of the first representative input value to the second representative input value is less than or equal to a predetermined value in addition to determining whether the second representative input value is greater than a second threshold value that is the threshold value, and
when it is determined that the second representative input value is greater than the second threshold value and the ratio of the first representative input value to the second representative input value is less than or equal to the predetermined value, at least one of the adaptive filter or the filter coefficient updater is transitioned from the normal state to the restriction state.

4. The active noise reduction device according to claim 1, wherein the filter coefficient updater in the restriction state stops update of the coefficient of the adaptive filter.

5. The active noise reduction device according to claim 1, wherein the filter coefficient updater in the restriction state updates the coefficient of the adaptive filter by using a step size parameter obtained by multiplying the step size parameter calculated by a coefficient that is greater than 0 and smaller than 1.

6. The active noise reduction device according to claim 1, wherein the adaptive filter in the restriction state generates the cancelling signal by applying the adaptive filter to the reference signal multiplied by a coefficient that is greater than 0 and smaller than 1.

7. The active noise reduction device according to claim 1, wherein the adaptive filter in the restriction state generates the cancelling signal by applying the adaptive filter obtained by multiplying the reference signal by a coefficient that is greater than 0 and smaller than 1.

8. The active noise reduction device according to claim 1, wherein the adaptive filter in the restriction state multiplies the cancelling signal generated, by a coefficient that is greater than 0 and smaller than 1, and outputs a multiplication result.

9. A vehicle comprising:
the active noise reduction device according to claim 1; and
the reference signal source.

10. An active noise reduction method that is executed by an active noise reduction device,
the active noise reduction device including:
a reference signal inputter to which a reference signal that has a correlation with noise in a space in a vehicle is input, the reference signal being output by a reference signal source attached to the vehicle;
an adaptive filter that generates a cancelling signal by adaptively filtering the reference signal, the cancelling signal being used to output a cancelling sound for reducing the noise;
a cancelling signal outputter to which the cancelling signal generated is output;

a cancelling sound source that generates a cancelling sound to correspond to the cancelling signal;

an error signal inputter to which an error signal is input, the error signal corresponding to a residual sound generated by interference between the cancelling sound and the noise;

a simulated acoustic sound transfer characteristics filter that generates a filtered reference signal by correcting the reference signal by using simulated transfer characteristics obtained by simulating acoustic sound transfer characteristics from the cancelling signal outputter to the error signal inputter;

a μ adjuster that calculates a step size parameter by multiplying a reference value for the step size parameter by a correction coefficient that is proportional to a reciprocal of a first representative input value that indicates a signal level of the reference signal or the filtered reference signal in a first predetermined period; and a filter coefficient updater that updates a coefficient of the adaptive filter by using the error signal, the filtered reference signal generated, and the step size parameter calculated, and the active noise reduction method comprising:

determining whether a second representative input value is greater than a threshold value, the second representative input value indicating a signal level of the reference signal or the filtered reference signal in a second predetermined period that is shorter than the first predetermined period; and transitioning at least one of the adaptive filter or the filter coefficient updater from a normal state to a restriction state in which an effect of reducing the noise is smaller than in the normal state when it is determined that the second representative input value is greater than the threshold value.

* * * * *